United States Patent Office 3,475,373
Patented Oct. 28, 1969

3,475,373
STABILIZATION OF POLYCARBONATES
Winston J. Jackson, Jr., and John R. Caldwell, Kingsport, Tenn., assignors to Eastman Kodak Company, Rochester N.Y., a corporation of New Jersey
No Drawing. Filed Aug. 11, 1965, Ser. No. 478,992
Int. Cl. C08g 17/13
U.S. Cl. 260—47                                    7 Claims

ABSTRACT OF THE DISCLOSURE

Polycarbonates having improved resistance to oxidation as high temperatures are prepared by terminating the polymer chains with alkyl or aryl carbonate or ester groups.

---

This invention relates to new and improved polycarbonate resins. More particularly, it is directed to novel carbonate polymers having improved resistance to oxidation at high temperatures and the process for preparing same.

It is known that many polycarbonate resins prepared from aromatic dihydroxy compounds have high heat-distortion temperatures, which makes them desirable for high-temperature applications which include uses such as electrical insulation for numerous purposes as in motors, generators and transformers, as motion picture film base for projection with high-wattage lamps, in the fabrication of temperature-resistant protective clothing, in the production of motor housings and as various molded parts for equipment which will be subjected to high temperatures. Since most high temperature applications are in the presence of air, it is important that the polycarbonates be oxidatively stable.

Various attempts have, in the past, been made to improve the high temperature oxidation resistance of polycarbonate resins. Such methods include external treatments, such as the incorporation of conventional antioxidants into the resin, and internal methods, such as by chemical modification of the polymer structure. The former method has resulted in only little success and, by its very nature, is not satisfactory. The latter method is, industrially, more suitable but, nevertheless, has not provided polycarbonates which are sufficiently stabilized for many high temperature applications. One such method of chemical modification involves modifying the terminal chain structure of polycarbonates represented by the general formulae $$[-O-X-O-\overset{O}{\underset{\|}{C}}-]_n \text{ or } [-O-X-O-\overset{O}{\underset{\|}{C}}-O-Y-O-\overset{O}{\underset{\|}{C}}-]_n$$

wherein —O—X—O— represents the divalent residue of a dihydroxy compound such as a bisphenol, —O—Y—O— is a diol residue and $n$ is greater than 20. In such a resin, the polymer chain is characterized by terminal hydroxyl groups of phenolic groups which are relatively unstable and readily oxidized.

In the past, a partial solution to the problem has been presented by the process of reacting an alcohol, a fluoro alcohol or a mercaptan with a partially formed carbonate polymer (i.e. prepolymer) and then continuing the polymerization reaction whereby products were obtained, the chains of which contained the terminating agent (i.e., alcohol or mercaptan residue) at one end thereof. This method has not, however, proved entirely satisfactory since all of the characteristic hydroxyl or phenolic groups of the polymer are not modified thereby. In other words, addition of a chain terminating agent such as an alcohol, fluoro alcohol or mercaptain during the polymerization necessarily means that, in order for polymerization to occur, at least one end of each polymer chain must terminate in a phenolic group. Thus, when polymerization has ceased, at least some of such end groups remain.

Accordingly, it is an object of this invention to provide novel, stabilized polycarbonates which are resistant to high temperature oxidation.

A further object of the invention is to provide polycarbonate resins wherein all of the polymer chain ends are terminated by alkyl or aryl carbonate or carboxylate groups.

A further object of the invention is to provide a novel method for preparing stable polycarbonates.

The above objects and other objects which will occur to those skilled in the art, are obtained by the process of this invention which, briefly, comprises sequentially treating the final, polymerized carbonate resin with (1) an acyl halide and (2) a hydroxy compound.

It has been found that the presence of hydroxyl groups, specifically phenolic groups, is responsible for the oxidative instability of carbonate polymers, since such groups are readily oxidized. Similarly it has been found that haloformate groups must be removed, since they are hydrolyzed to phenolic groups when the polycarbonate resins are prepared in the presence of a tertiary amine and subsequently washed with water to remove hydrogen halide formed as a by-product during the polymerization reaction. Further, when the polycarbonate is prepared by the interfacial method in the presence of aqueous alkali, some terminal haloformate groups are hydrolyzed to phenolic groups when the polymer is washed with water, and the polycarbonate resin thus contains both phenolic groups and haloformate groups which introduce thermal oxidative instability.

By the method of this invention polycarbonates represented by the general formulae given above, and having terminal phenolic groups, are sequentially treated with an acyl halide and a monohydroxy compound. The acyl halide, which may be a haloformate represented by the formula ROCOX or an acid halide, represented by the formula RCOX reacts with the terminal phenolic group as set forth in the following reactions, depending upon whether the polymer had been prepared in the presence of sodium hydroxide or similar base or in the presence of a tertiary amine, and whether the acyl halide utilized is a haloformate or an acid halide:

PREPARATION IN SODIUM HYDROXIDE

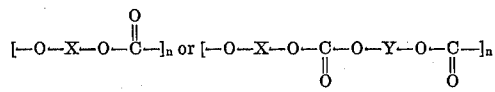

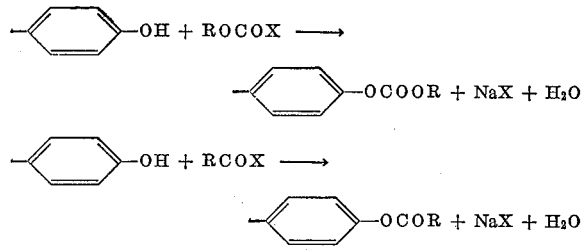

PREPARATION IN TERTIARY AMINE

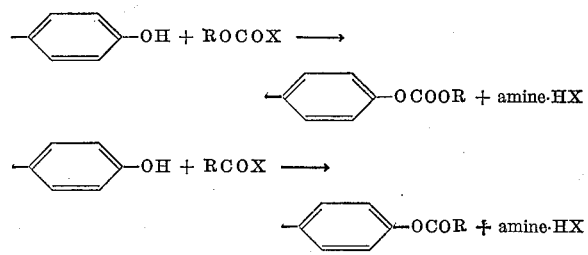

wherein R is an aromatic or aliphatic radical of 1–20 carbon atoms and X is halogen. In this way, all phenolic terminal groups in the polycarbonate resins are converted to the more stable carbonate or carboxylate.

Upon completion of the reaction of the acyl halide with the terminal phenolic groups of the polymer, a monohydroxy compound is added to the reaction mixture to react with excess acyl halide and with any terminal haloformate groups which may be present in the resin. Thus, terminal haloformate groups are converted to a more stable form as follows:

wherein R is an aliphatic or aromatic radical of 1–20 carbon atoms and X is halogen.

Accordingly, homopolymers prepared by the method of the invention are represented by the formulae

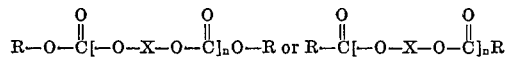

and copolymers are represented by the formulae

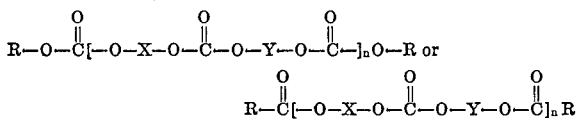

wherein R is an aliphatic or aromatic radical of 1–20 carbon atoms, —O—X—O is an aromatic dihydroxy compound residue, —O—Y—O is a diolbishaloformate residue and $n$ is greater than 20.

The process of this invention is applicable to any polycarbonate resin which contains the residue of at least one aromatic dihydroxy compound. Conventional procedures for preparing the polycarbonates which are treated in accordance with the invention, are the interfacial and tertiary amine methods. In the interfacial process, the polycarbonates from bisphenols may be prepared by adding a carbonyl halide and/or a bishaloformate of a diol, to a cooled, stirred aqueous mixture containing sodium hydroxide, the bisphenol, any modifying diols, a catalyst, and methylene chloride phase.

A bisphenol (residue shown by —O—X—O—) and phosgene give recurring structural units in the polymer of:

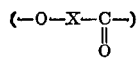

A bisphenol and a bischloroformate of a diol (residue shown by

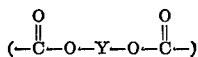

give recurring structural units of:

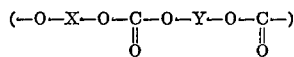

The diol from which the bischloroformate is prepared may be aromatic, aliphatic, or alicyclic, and may be primary, secondary, or tertiary. The carbon chain of aliphatic diols may be straight, or branched and may contain from 2 to 20 carbon atoms. Examples of diols are ethylene glycol, 2,2-dimethyl-1,3-propane-diol, 1,6-hexanediol, 1,4-hexanediol, 2,5-norbornanediol, hydroquinone, and 4,4′-isopropylidenediphenol. Also any of the following groups may be present in the molecule (R=alkyl or aryl): —R$_2$C—, —O—, —OCH$_2$CH$_2$O—, —S—, —SO—, —SO$_2$—, —SO$_2$NR—, —NR—, —CONH—, —CO—, —COO—, —CF$_2$—, —NRNR—, —CH=CH—, —C≡C—, phenylene, cyclohexylene, etc.

Bischloroformates of aliphatic and alicyclic diols may be prepared by adding an excess of phosgene to the diol suspended in ethylene dichloride. If the diol reacts very slowly, some dry dioxane is also added to increase its solubility in the medium. After all of the diol has been dissolved, dry air is passed in until all of the hydrogen chloride and excess phosgene has been swept out. The bischloroformate solution may then be used as needed in the polymerization reactions.

Bischloroformates of aromatic diols, including bisphenols, may be prepared by simultaneously adding the diol (dissolved in dioxane) and dimethylaniline to a stirred solution of phosgene in toluene. A similar procedure is described in British Patent 613,280.

When a bischloroformate is added to the reaction mixture, the molar amount of the bisphenol preferably should be equal or in slight excess (5 mole percent). When phosgene and a bischloroformate are both added, or the phosgene alone is used, the phosgene preferably should be 5 to 10 mole percent in excess of its equivalent bisphenol in the reaction mixture. A quaternary ammonium salt or hydroxide increases the rate of polymerization. This may also be acocmplished with certain tertiary amines, such as tri-n-butyl amine, which is preferred. The temperature range is, preferably, 15–25° C. At lower temperatures a longer reaction time is required. At higher temperatures hydrolysis tends to lower the inherent viscosity of the polymer product. Depending upon the catalyst used, the normal reaction time required to obtain a maximum molecular weight product may vary from 10 minutes to 2 hours. The reaction rate is slower if impure reactants or if no catalyst is used. Longer reaction times permit polymer hydrolysis which tends to lower its molecular weight. At the end of the reaction time the alkali present must be neutralized with acetic, hydrochloric, or other acid. The polymer is treated, according to the method of the invention, prior to the neutralization step.

Suitable aromatic dihydroxy compounds which can be advantageously used in preparing the carbonate polymers include hydroquinone, resorcinol, naphthalenediol and those illustrated by the general formula

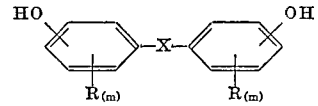

wherein R is hydrogen, chlorine, bromine, nitro, alkyl or alkoxy, $x$ is oxygen, substituted or nonsubstituted alkyl or cycloalkyl, alkaryl, sulfur or sulfur containing radicals such as sulfonyl or radicals having the formulae

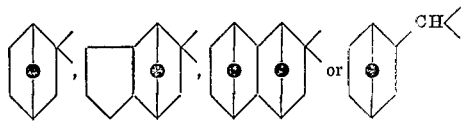

and $m$ is 1, 2, 3 or 4.

Among the aromatic dihydroxy compounds which may be included in the polycarbonate are 4,4′-isopropylidenediphenol, 4,4′-cyclohexylidenediphenol, 4,4′-(2-norbornylidene)diphenol, 4,4′-(2-norbornylidene)di-o-cresol, 4,4′-(2 - norbornylidene)bis[2,6-dichlorophenol], 4,4′ - (hexahydro - 4,7 - methanoindan-5-ylidene)diphenol, 4,4′ - (2-norbornylidene)bis - [2,6 - dibromophenol], 4,4′ - (hexanaphtha - 2 - yl - methylene)diphenol, 4,4′-(2-norbornylhydro-4,7-methanoindan-5-ylidene)di-o-cresol, 4,4′-(hexahydro - 4,7 - methanoindan-5-ylidene)bis[2,6 - dichlorophenol], 4,4′-(decahydro-1, 4:5,8 - dimethanonaphth-2-ylidene)diphenol, 4,4′-(decahydro - 1,4:5,8 - dimethanonaphth - 2 - yl - methylene)diphenol, 4,4′-(2-norbornylmethylene)diphenol, 4,4′ - (2 - norbornylmethylene)bis-[2,6-dichlorophenol], 4,4′ - (3 - methyl - 2 - norbornylmethylene)diphenol, 4,4′ - sulfoxydiphenol, 4,4′ - sulfonyldiphenol, 2,4′-dihydroxydiphenyl-methane, 4,4′-(decahydro-1,4:5,8 - dimethanonapth - 2 - ylidene)di-o-cresol, bis-(2-hydroxyphenyl)-methane, bis-(4-hydroxyphenyl)-methane, bis-(4-hydroxy-5-nitrophenyl)-methane, bis-(4-hydroxy-2,6-dimethyl-3-methoxyphenyl) - methane, 1,1-bis-(4-hydroxyphenyl)ethane, 1,1-bis-(4 - hydroxy-2-chlorophenyl)-ethane, 1,1-bis-(2,5-dimethyl - 4 - hydroxyphenyl)-ethane, 1,3 - bis - (3 - methyl-4-hydroxyphenyl)- propane, 2,2-bis-(3-phenyl - 4 - hydroxyphenyl)-propane, 2,2-bis-(3-isopropyl-4-hydroxyphenyl)-propane, 2,2 - bis-(4-hydroxyphenyl)-pentane, 3,3 - bis-(4-hydroxyphenyl)-pentane, 2,2-bis-(4-hydroxyphenyl)-heptane, bis - (4-hydroxyphenyl)- phenyl methane, bis-(4-hydroxyphenyl)- cyclohexyl methane, 1,2-bis-(4-hydroxyphenyl) - 1,2-bis-(phenyl)-ethane, 2,2-bis - (4 - hydroxyphenyl) - 1,3 - bis (phenyl)-propane, 2,2-bis-(4-hydroxyphenyl) - 1 - phenyl propane, 4,4'-dihydroxy - 3,3',5,5' - tetrachlorodiphenyl, 4,4'-dihydroxy-3,3',5,5'-tetrachlorodiphenylmethane, 4,4'-dihydroxy-3,3'-dichlorodiphenyl-2,2-propane, 4,4' - dihydroxy-3,3',5,5'-tetrachlorodiphenyl-2,2-propane, 4,4'-dihydroxy-3,3',5,5'-tetrabromodiphenyl-2,2-propane, 4,4'-dihydroxy-3,3',5,5'-tetrachlorodiphenyl-1,1-cyclohexane, 4,4'-dihydroxy - (2,4,6 - trichloro - α - methylbenzylidene)diphenyl, and the like.

In the tertiary amine process, a carbonyl halide is added to a solution containing a tertiary amine, a solvent, such as methylene chloride, and an aromatic dihydroxy compound. The process of this invention is also applicable to polycarbonate resins, prepared by the interfacial process, which are in the form of small, uniform particles. Further, the process of the invention is applicable to polycarbonates prepared by adding a carbonyl halide and/or a diolbishaloformate to a solution containing an aromatic dihydroxy compound, a tertiary amine and a solvent which will dissolve the polymer but not the amine hydrohalide which is formed during the reaction. In the latter process, the acyl halide and monohydroxy compound are added to the reaction mixture prior to filtering said mixture to remove the amine hydrohalide.

Short-chain polymer glycols such as hydroxy-terminated or chloroformate-terminated polyethers, polyformals, polyesters, aliphatic polycarbonates or poly(ether urethanes) may also be incorporated into the polymer.

Preferably, the aromatic dihydroxy compound (e.g. bisphenols) constitutes the major portion of the final polymer with the diol and/or polymer glycol constituting a minor proportion.

When the tertiary amine process is used for preparing the polycarbonates of the invention, suitable amines include pyridine, triethylamine, tributylamine, dimethylaniline, and the like.

The carbonyl halide used in preparing the polymers of the invention is a compound of the formula $COX_2$ wherein X is a halogen such as chlorine or bromine. Suitable carbonyl halides includes phosgene and bromophosgene.

Suitable inert solvents, which are utilized as reaction media, include methylene chloride, dioxane, chloroform, ethylene dichloride and the like.

As stated above, the acyl halide may be a haloformate represented by the formula $ROCOX$ or an acid halide represented by the formula $RCOX$ wherein R is a substituted or nonsubstituted aliphatic or aromatic radical containing from 1 to 20 carbon atoms and X is halogen. Typical substituents on the aliphatic or aromatic radical are, for example, alkoxy, halogen and the like. Typical acyl halides include alkyl haloformates such as ethyl chlorformate, ethyl bromoformate, isopropyl chloroformate, amyl bromoformate, octyl chloroformate, eicosyl chloroformate, aryl haloformates such as phenyl chloroformate, methoxyphenyl bromoformate, aliphatic monocarboxylic acid halides such as acetyl chloride, acetyl bromide, propionyl chloride, isobutyryl chloride, hexanoyl chloride, decanoyl bromide, myristyl chloride, stearyl bromide, aromatic monocarboxylic acid halides, such as benzoyl chloride and the like. The amount of acyl halide which is added to the reaction mixture is not critical, but should be sufficient to terminate substantially all of the phenolic groups. About 5 mole percent, based on the aromatic dihydroxy compound used in the polymerization, is sufficient. The reaction mixture is then stirred for fifteen minutes to thirty minutes to ensure complete reaction between the acyl halide and the phenolic groups.

The monohydroxy compound which is added, subsequent to the reaction of the acyl halide with the phenolic groups, is represented by the formula ROH, wherein R is an aliphatic or aromatic radical containing from 1 to 20 carbon atoms. When the reaction is carried out in the presence of an aqueous phase (such as is present when utilizing the interfacial process) it is preferable that R be aromatic since under those conditions, phenolic compounds have been found to be more reactive than aliphatic alcohols. When the tertiary amine process is used for polymerization, R may be either aliphatic or aromatic. To ensure reaction of the hydroxy compound with all of the excess acyl halide and terminal haloformate groups, a substantial molar excess of hydroxy compound is added. For example, if 0.05 mole of acyl halide is added to terminate phenolic groups, then about 0.1 or more moles of ROH is added. If the hydroxy compound is water soluble, the excess is readily moved from the polymer when the reaction mixture is washed with water. If, however, the hydroxy compound is not soluble, the excess is removed upon precipitation of the polymer by the addition, to the reaction mixture, of a solvent which will dissolve the hydroxy compound but not the polymer, such as methyl alcohol, acetone or isopropylacetate.

Suitable hydroxy compounds which are used in accordance with the invention are primary and secondary aliphatic and aromatic monohydroxy compounds such as ethanol, isopropanol, amyl alcohol, n-butanol, sec-butanol, dodecanol, octadecanol, benzyl alcohol, phenol, o,m,p-cresol and the like.

The amount of oxidation which occurs upon heating a polycarbonate film in air is determined by the degree of color formation in the film. Further, oxidation apparently involves free radical formation and coupling of the polymer chains giving a cross-linked structure, since the oxidized films become brittle and insoluble. When the films lose their toughness and become brittle, they are useless in many applications. Color formation and loss of properties due to oxidation also occurs when polycarbonates are injection molded. Temperatures of 400° C. and higher are required to injection mold some polycarbonates. As with films, color formation and embrittlement occur when the finished molded objects are subjected to high temperatures in the presence of air for appreciable periods of time.

The following examples illustrate preferred modes for carrying out the process of the invention and are not to be construed as a limitation thereon.

Example 1

In a two liter, 3-necked flask, there were placed 168 g. (0.6 mole) of 4,4'-(2-norbornylidene) diphenol, 142 ml. of dry pyridine and 1000 ml. of methylene chloride. The mixture was stirred and, with the temperature held at 25–30° C., phosgene was passed in at a rate of about 1 g./min. until 59 g. had been added. The rate of phosgene addition was then decreased to about 0.2 g./min. and the addition was continued until the mixture became very viscous. Total phosgene added was 67 g. A 100 ml. sample (A) was then removed, diluted with methylene chloride, washed with water, dilute hydrochloric acid and, again, with water. To the remaining polymer mixture in the reaction flask was added 3.3 g. (0.03 mole) of ethyl chloroformate. After this mixture was stirred for 20 minutes, 8.5 g. of isopropanol was added and stirring was continued for ½ hr. The mixture remaining in the flask designated sample (B) was then treated in the same manner as sample (A) and the polymers were each precipitated by addition of isopropanol to the stirred methylene chloride solutions. After being dried, the inherent viscosity (measured in chloroform) of (A) was 0.81 and that of (B) was 0.84.

A 3-mil film of each polymer was then cast from methylene chloride. After the films were heated in air in a forced-convection oven at 200° C. for 60 hr., each film was still tough. Film (A), however, was insoluble in methylene chloride whereas film (B) from the terminated polymer was completely soluble. Also, film (A) was light yellow in color whereas film (B) was only a faintly pale yellow. The remainder of each of the two films was then heated for an additional four days in the oven at 200° C. After this time, the yellow color of film (A) was appreciably more intense than that of (B) and (A) formed cracks on creasing whereas film (B) remained tough and did not crack.

Example 2

A polycarbonate was prepared from 4,4'-(2-norbornylidene)bis[2,6-dichlorophenol] and phosgene. In accordance with Example 1, a 100-ml. sample (A) was then removed, diluted with methylene chloride and washed, sequentially with water, hydrochloric acid and water. To the remaining polymer mixture in the reaction flask (B), was added 3.3 g. of isopropyl chloroformate. The mixture was then stirred for 20 min., and 8.5 g. of isopropanol was added and the stirring was continued for an additional ½ hr. Sample (B) was then treated in the same manner as (A) and the polymers were precipitated by the addition of isopropanol to the stirred methylene chloride solutions. After drying, the inherent viscosity (in chloroform) of (A) was 0.84 and that of (B) was 0.89. A 1-mil film of each polymer was cast from methylene chloride. After the films were heated in air in a forced-convection oven at 245° C. for 60 hr., the color of a film of the unterminated sample (A) was orange and was approximately three times as intense as the color of terminated sample (B). Film (A) cracked on creasing whereas film (B) did not crack.

Example 3

A polycarbonate was prepared from 4,4'-isopropylidenediphenol and phosgene by the procedure of Example 1. The polymer was terminated with phenyl chloroformate instead of ethyl chloroformate or isopropyl chloroformate as used in Examples 1 and 2. The inherent viscosity (in chloroform) of sample (A) was 1.02 and the inherent viscosity of terminated sample (B) was 1.04.

A 5-mil film of each of the polymers was cast from methylene chloride and heated in air in a forced-convection oven at 180° C. for 60 days. After this treatment, film (A) was substantially more colored than terminated film (B).

Example 4

A polycarbonate was prepared from 0.6 mole of hydroquinone and 0.6 mole of 1,4-cyclohexanediol bischloroformate by the general procedure of Example 1. The polymer was terminated by addition of acetyl chloride and further treated as in the procedure of Example 1. The inherent viscosity of sample (A) was 0.62 and that of sample (B) was 0.63.

A 3-mil film of each polymer was cast from methylene chloride and heated in air in the forced convection oven at 150° C. for 30 days. After this treatment, the film prepared from the terminated polymer (B) was tougher and had substantially less color than that of film (A).

Example 5

A polycarbonate was prepared from 4,4'-(hexahydro-4,7-methanoindan-5-ylidene)diphenol and phosgene by the procedure of Example 1. The tertiary amine used in the polymerization reaction was triethylamine instead of pyridine as in Example 1 and benzoylchloride was used to terminate the polymer. The inherent viscosity (in chloroform) of sample (A) was 0.50 and the inherent viscosity of the terminated sample (B) was 0.54.

A 2-mil film of each polymer was cast from methylene chloride and heated in air in the forced-convection oven at 200° C. for 7 days. After this treatment, film (A) was orange and cracked on creasing. The terminated film (B), however, was yellow in color and did not crack when creased.

Example 6

In a 500-ml. flask were placed 5.7 g. of sodium hydroxide dissolved in 120 ml. of water, 14.0 g. (0.05 mole) of 4,4'-(2-norbornylidene)diphenol, 140 ml. of methylene chloride and 4 drops of tributylamine. While the mixture was stirred, and cooled in a water bath which held the temperature of the mixture at 15–20° C., phosgene was slowly passed into the solution until the methylene chloride layer became viscous. The weight of phosgene added was 5.7 g. A portion of the organic layer, sample (A), was removed and neutralized with dilute hydrochloric acid. Ethyl chloroformate (1.0 g.) was then added to the remainder of the reaction mixture, sample (B), and the mixture was stirred for ½ hr. Phenol (1.0 g.) was then added and stirring was continued for an additional ½ hr. The mixture was thereafter neutralized with dilute hydrochloric acid, and each polymer solution was diluted with methylene chloride and thoroughly washed with water. The polymers were precipitated by the addition of methanol. The inherent viscosity (in chloroform) of sample (A) was 1.22 and that of sample (B) was 1.26.

When 3-mil films of the polymers were heated in air at 200° C., as in Example 1, substantially the same results were obtained. Film (B) was more stable, less colored and tougher than film (A).

Example 7

A polycarbonate was prepared from 4,4'- (2-norbornlymethylene)diphenol and phosgene by the procedure of Example 6. Sample (B) of the polymer solution was terminated with propionyl chloride instead of ethyl chloroformate as in Example 6. The inherent viscosity (in chloroform) of sample (A) was 0.76 and that of (B) was 0.76.

A 2-mil film of each polymer was then cast from methylene chloride and heated in air in a forced-convection oven at 200° C. for 6 days. Film (A) was orange in color and cracked when creased. Film (B) was yellow in color and did not crack when creased.

Example 8

The method of Example 1 was used for preparing a polycarbonate from 280 g. (1.0 mole) of 4,4'-(2-norbornylidene)diphenol. The reaction mixture was then divided in two equal portions. Portion (A) was stirred with 100 ml. of water for 1 hr. Portion (B) was stirred with 4.0 g. of phenyl chloroformate for 30 min. and then with 4.5 g. of phenol for 30 min. Both portions were acidified with dilute hydrochloric acid and thoroughly washed with water. The polymers were then precipitated by adding isopropanol to the stirred solutions. Portion (A) had an inherent viscosity (in chloroform) of 0.56 and portion (B) had an inherent viscosity of 0.59.

After the polymers were dried overnight in a vacuum oven at 125° C., they were injection-molded at 720° F. After the molding, polymer (A) had an inherent viscosity (in chloroform) of 0.45 and polymer (B) had an inherent viscosity of 0.51. Thus, polymer (A) suffered a loss of 20 percent inherent viscosity whereas polymer (B) had only a 14 percent loss. Polymer (A) was yellow-orange in color whereas polymer (B) was a pale yellow. When molded samples were heated in an oven at 200° C. for 136 hr., less color was produced in samples of polymer (B) than of polymer (A).

When the polycarbonate resin is to be molded, as above, it is preferably terminated with phenyl carbonate or phenyl carboxylate groups, since the phenyl group is more stable than alkyl groups at the very high temperatures required for molding.

Thus, by the process of this invention, novel polycarbonate resins are obtained which are free of terminal phenolic groups, such groups having been replaced by alkyl or aryl carbonate or carboxylate groups.

We claim:
1. The process of stabilizing a carbonate polymer con- taining a residue of an aromatic dihydroxy compound having the hydroxy groups attached directly to the aromatic moiety which comprises reacting said polymer with an acyl halide and reacting the resulting polymer reaction mixture with a hydroxy compound having the formula ROH wherein R is an aliphatic or aromatic radical of 1 to 20 carbon atoms.

2. The process of stabilizing a carbonate polymer characterized by recurring structural units selected from the group consisting of

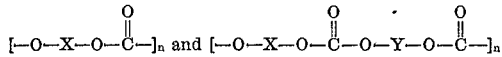

wherein –O–X–O– is the residue of an aromatic dihydroxy compound having the hydroxy groups attached directly to the aromatic moiety, –O–Y–O– is the residue of a diolbishaloformate and $n$ is an integer greater than 20 which comprises reacting said polymer with an acyl halide and reacting the resulting reaction polymer mixture with a hydroxy compound having the formula ROH wherein R is an aliphatic or aromatic radical of 1 to 20 carbon atoms.

3. The process of claim 2 wherein said acyl halide is selected from the group consisting of ROCOX' or RCOX' wherein R is an aliphatic and aromatic radical of 1–20 carbon atoms and X' is halogen.

4. The process of claim 3 wherein said acyl halide is selected from the group consisting of ethyl chloroformate, isopropyl chloroformate, phenyl chloroformate, benzoyl chloride, acetyl chloride and propionyl chloride.

5. The process of claim 2 wherein said hydroxy compound is selected from the group consisting of isopropanol and phenol.

6. The process of claim 3 wherein the concentration of said halide is about 5 mole percent, based on the amount of aromatic dihydroxy compound used in the polymerization.

7. The process of claim 2 wherein a molar excess of the hydroxy compound is used, based on the concentration of acyl halide.

References Cited

UNITED STATES PATENTS

| | | | |
|---|---|---|---|
| 2,789,964 | 4/1957 | Reynolds et al. | 260—47 |
| 2,789,966 | 4/1957 | Reynolds et al. | 260—47 |
| 2,964,797 | 12/1960 | Peilstocker et al. | 260—47 |
| 3,022,272 | 2/1962 | Schnell et al. | 260—47 |
| 3,177,179 | 4/1965 | Lee et al. | 260—47 |
| 3,290,409 | 12/1966 | Munro | 260—47 |
| 3,335,111 | 8/1967 | Pray et al. | 260—47 |

FOREIGN PATENTS

| | | |
|---|---|---|
| 1,366,288 | 6/1964 | France. |
| 1,353,209 | 1/1964 | France. |

OTHER REFERENCES

Schnell: "Chemistry and Physics of Polycarbonates," Interscience Publ., N.Y., 1964, pp. 46–47.

SAMUEL H. BLECH, Primary Examiner

U.S. Cl. X.R.

260—49, 33.8

PO-1050
(5/69)

UNITED STATES PATENT OFFICE
CERTIFICATE OF CORRECTION

Patent No. 3,475,373     Dated October 28, 1969

Inventor(s) Winston J. Jackson and John R. Caldwell

It is certified that error appears in the above-identified patent and that said Letters Patent are hereby corrected as shown below:

Column 4, lines 58-60, "4,4'-(hexanaphtha-2-yl-methylene)-diphenol, 4,4'-(2-norbornyl-hydro-4,7-methanoindan-5-ylidene)di-o-cresol" should read ---4,4'-(hexahydro-4,7-methanoindan-5-ylidene)di-o-cresol---. Column 9, line 24, "or" should read ---and---. Column 9, line 25, "and" should read ---or---.

SIGNED AND
SEALED
SEP 22 1970

(SEAL)
Attest:

Edward M. Fletcher, Jr.
Attesting Officer

WILLIAM E. SCHUYLER, JR.
Commissioner of Patents